(12) United States Patent
Ebert (10) Patent No.: US 8,740,676 B2
(45) Date of Patent: Jun. 3, 2014

(54) FILLING ASSEMBLY FOR A CLIPPING MACHINE FOR PRODUCING SAUSAGE-SHAPED PRODUCTS

(71) Applicant: Poly-Clip System GmbH & Co. KG, Hattersheim (DE)

(72) Inventor: Detlef Ebert, Bad Nauheim (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 0 days.

(21) Appl. No.: 14/075,929

(22) Filed: Nov. 8, 2013

(65) Prior Publication Data

US 2014/0127985 A1 May 8, 2014

(30) Foreign Application Priority Data

Nov. 8, 2012 (EP) .................................. 12191809

(51) Int. Cl.
*A22C 11/00* (2006.01)
(52) U.S. Cl.
USPC ............................................................ 452/35
(58) Field of Classification Search
USPC .................. 452/21–26, 30–35, 37, 46–48, 51
See application file for complete search history.

(56) References Cited

U.S. PATENT DOCUMENTS

| | | | | |
|---|---|---|---|---|
| 3,399,066 A | * | 8/1968 | Ziolko | 426/233 |
| 3,457,588 A | * | 7/1969 | Beckman et al. | 452/31 |
| 4,776,062 A | * | 10/1988 | Bacon | 452/35 |
| 4,837,896 A | * | 6/1989 | Lockard | 452/38 |
| 4,847,951 A | * | 7/1989 | Kollross | 452/48 |
| 4,914,784 A | * | 4/1990 | Nausedas | 452/34 |
| 6,139,416 A | * | 10/2000 | Topfer | 452/31 |
| 6,651,705 B1 | | 11/2003 | Töpfer et al. | |
| 7,392,642 B2 | | 7/2008 | Töpfer | |
| 7,771,254 B2 | * | 8/2010 | Nunn | 452/30 |
| 8,137,167 B2 | * | 3/2012 | Baechtle et al. | 452/36 |
| 8,157,623 B2 | * | 4/2012 | Weller et al. | 452/32 |
| 8,277,293 B2 | | 10/2012 | Maile et al. | |
| 8,376,002 B2 | * | 2/2013 | Jens | 141/284 |
| 2010/0233949 A1 | * | 9/2010 | Maile et al. | 452/35 |
| 2010/0330891 A1 | * | 12/2010 | Baechtle et al. | 452/36 |
| 2012/0175015 A1 | | 7/2012 | Jens | |

FOREIGN PATENT DOCUMENTS

| | | |
|---|---|---|
| DE | 20 2009 013 062 U1 | 2/2011 |
| EP | 1777161 A1 | 4/2007 |
| EP | 2227963 A1 | 9/2010 |

* cited by examiner

*Primary Examiner* — Richard Price, Jr.
(74) *Attorney, Agent, or Firm* — Hahn Loeser & Parks LLP (57) ABSTRACT

A filling assembly for being mounted to a clipping machine for producing sausage-shaped products comprising a filling tube for filling flowable material into a packaging casing that is arrangeable onto filling tube; a casing brake unit with a brake body for being detachably and relatively fixable arranged on filling tube in a braking position for providing a resistance to the packaging casing against uncontrolled sliding-off of the filling tube; and a mounting unit for mounting filling tube and casing brake unit to the clipping machine. Mounting unit comprises a bearing device for allowing a relative movement of filling tube and casing brake unit to the clipping machine, when mounting unit is mounted with filling tube and casing brake unit to the clipping machine, between at least a production position and an interchanging position.

25 Claims, 8 Drawing Sheets

Fig. 8 ured products, like sausages. The filling assembly comprises a
FILLING ASSEMBLY FOR A CLIPPING MACHINE FOR PRODUCING SAUSAGE-SHAPED PRODUCTS This application claims priority to, and the benefit of, European Patent Application No. 12 191 809.8-1655 filed Nov. 8, 2012 with the European Patent Office, which is hereby incorporated by reference.

BACKGROUND OF THE INVENTION

The invention refers to a filling assembly for being mounted to a clipping machine for producing sausage-shaped products, like sausages. The filling assembly comprises a filling tube with a filling tube axis for filling paste-like, granular and/or liquid material, in a filling process, into a tubular or bag-shaped packaging casing. The packaging casing to be filled with the paste-like, granular and/or liquid filling material is arrangeable onto the filling tube and/or to encase the filling tube. The filling assembly further comprises a casing brake unit with a brake axis and a brake body for being detachably arranged on the filling tube in a braking position for providing a controlled resistance to the packaging casing against uncontrolled sliding-off the filling tube during the filling process. The brake body is relatively fixable to the filling tube in the braking position. The brake axis is coaxial with the filling tube axis when the brake body is arranged on the filling tube in the braking position. In addition, the filling assembly comprises a mounting unit for mounting the filling tube and the casing brake unit to the clipping machine.

In practice, it is known that during the manufacture of sausage-shaped products, like sausages, on a clipping machine, paste-like, granular and/or liquid material is fed from a filling tube with a filling pressure in a feeding direction into a tubular or bag-shaped packaging casing. The packaging casing is stored on the filling tube and closed at its front end, i.e. the end pointing in or downstream the feeding direction. During the filling process, the packaging casing is pulled-off the filling tube by the filling pressure. For preventing the tubular or bag-shaped packaging casing from uncontrolled sliding-off the filling tube, a casing brake unit with a brake body is provided wherein the brake body is detachably arranged on the filling tube. The brake body is configured for providing a frictional force to the packaging casing at least while the packaging casing is being pulled-off the filling tube. After a determined volume of filling material has been filled into the packaging casing, a displacer unit forms a plait-like portion to a back end of the filled packaging casing that is pointing against or upstream the feeding direction. Subsequently, the back end is being closed by a clipping unit by placing and closing at least one closure clip at the plait-like portion. Optionally, in a final step the sausage-shaped product that just has been closed is cut-off the packaging casing provided on the filling tube by a cutting unit.

The diameter of the sausage-shaped product to be produced defines the outer diameter of the filling tube and the inner diameter of the brake body, respectively. Therefore, in order to produce sausage-shaped products of different diameters, different filling tubes with corresponding outer diameters and brake bodies with corresponding inner diameters have to be used. Accordingly, for switching production to sausage-shaped products that have a diameter different from the previously produced sausage-shaped products, at least the previously used filling tube has to be replaced by a suitable filling tube having a compatible diameter to the sausage-shaped products to be produced. Furthermore, either the previously used brake body is not compatible with the suitable filling tube and has to be replaced by a suitable brake body or the previously used brake body has an adjustable inner diameter that can be fitted the selected filling tube, respectively.

Moreover, brake bodies are usually made of comparatively soft material, like rubber, and are subject to permanent friction with the packaging casing. Therefore, brake bodies generally suffer stronger wear-out than other components of the clipping machine, i.e. the filling tube, displacer unit or clipping unit. Worn-out brake bodies can lead to machine failure, i.e. by damaging the packaging casing or providing not enough friction to the packaging casing which will lead to an increased amount of packaging casing being pulled-off the filling tube per product produced. As a result, the clipping machine can be damaged, production has to be stopped and/or the product is faulty. Therefore, it is necessary to replace the brake body of a clipping machine after a certain usage, i.e. time of usage or length of processed packaging casing.

Beyond that, the packaging casing has to be replaced when the previous one has been consumed, since, in most of the cases, the packaging casing has already a tubular shape. Thus, the packaging casing has to be imposed on the filling tube from its delivery end, i.e. the end of the filling tube facing in the feeding direction of the filling material and having a filling outlet. Therefore, the operator needs an easy access to this filling tube end, wherein at least the brake body has to be removed from the filling tube. Preferably, the whole casing brake unit has to be removed for an improved accessibility of the filling tube, especially of its delivery end.

In known clipping machines, for removing the filling tube from the clipping machine and/or feeding packaging casing to the filling tube, the brake body has to be removed or disassembled from the filling tube first. After replacement of the filling tube and/or feeding packaging casing to the filling tube, the brake body has to be reassembled to the filling tube again. In some types of filling machines the displacer unit and/or the clipping unit are arranged so close to the brake body that they have to be moved aside first before the brake body can be removed or disassembled from the filling tube. Such replacement procedures are relatively complicated and time-consuming and will consequently cause unwanted production down-time.

In other types of known clipping machines, the brake body is provided at the clipping unit of the clipping machine, wherein the clipping unit is pivotally arranged at the clipping machine. Furthermore, the end of the filling tube that is opposite to the filling outlet is pivotally arranged at the clipping machine. Consequently, the filling tube and clipping unit can pivot relatively to the clipping machine around different pivot-axes. For replacing the filling tube and/or feeding packaging casing to the filling tube, the clipping unit with the brake body has to be pivoted, thus removing the brake body from the filling tube. Subsequently or simultaneously, the filling tube can be pivoted away from the clipping machine to a suitable position for replacing the filling tube and/or feeding packaging casing to the filling tube. This procedure is generally complicated and may cause damages to the brake body due to a tilt action with the filling tube.

In another type of known clipping machines, the clipping unit and a brake body holder are fixedly attached to the clipping machine. The filling tube is pivotally attached at the clipping machine. The brake body holder comprises a guide rail for holding the brake body on the filling tube when the filling tube is not pivoted away from the clipping machine. The guide rail of the brake body holder is usually shaped like a fork, comprising at least two teeth, wherein the brake body is interposed in between the two teeth when the brake holder is arranged on the filling tube and the filling tube is not pivoted away from the clipping machine. Consequently, the brake body holder is configured for releasing the brake body when the filling tube with the brake body still mounted, is pivoted away from the clipping machine. Once the filling tube is pivoted away from the clipping machine, the brake body can be removed from the filling tube along the filling tube axis. The whole process, especially the mounting process of the brake body onto the filling tube and the engaging process the brake body with the brake body holder while pivoting the filling tube back towards the clipping machine, is very cumbersome and time consuming.

Another solution for arranging a brake body at a clipping machine for being removably attached to a filling tube is known from DE utility model 20 2009 013 062. The brake body holder is attached to a wheeled crab that is guided on a rail. The rail is fixedly attached to the clipping machine. The filling tube is pivotally attached to the clipping machine as well. By pivoting the filling tube together with the brake body away from the clipping machine, the crap is forced along the rail, thereby pulling the brake body off the filling tube. By pivoting the filling tube back towards the clipping machine, the brake body is pushed back onto the filling tube by the guided crap, respectively. This system bears the disadvantage that forces are transmitted from the pivoting action of the filling tube via the brake body to the crab and back to the brake body for the pulling action and the pushing action, respectively, wherein the brake body is not restraint-guided along the filling tube axis. Consequently, the pivoting procedure can cause damages to the brake body. Furthermore, especially the process of pushing the brake body onto the filling tube is complicated and time consuming because brake body and filling tube usually have to be aligned manually.

It is therefore an object of the present invention to provide a filling assembly for being mounted to a clipping machine that allows an easier and faster access to the filling tube for replacement of the filling tube and the brake body and/or for replacement of the packaging casing, thus reducing work load for the operator of the clipping machine and minimizing production down-time.

SUMMARY OF THE INVENTION

This object is achieved by a filling assembly for being mounted to a clipping machine for producing sausage-shaped products, like sausages, wherein the filling assembly comprises a filling tube with a filling tube axis for filling paste-like, granular and/or liquid material, in a filling process, in a feeding direction into a tubular or bag-shaped packaging casing. The packaging casing to be filled is arrangeable onto the filling tube and/or to encase the filling tube, respectively. The filling assembly further comprises a casing brake unit with a brake axis and a brake body for being detachably arranged on the filling tube in a braking position for providing a controlled resistance to the packaging casing against uncontrolled sliding-off the filling tube during the filling process. The brake body is relatively fixable to the filling tube in the braking position. The brake axis is coaxial with the filling tube axis when the casing brake unit is arranged on the filing tube at least in the braking position.

The invention is further defined such that a mounting unit is provided for mounting the filling tube and the casing brake unit to the clipping machine. The mounting unit further comprises a bearing device for allowing a relative movement of the filling tube and the casing brake unit to the clipping machine, when the mounting unit is mounted with the filling tube and the casing brake unit to the clipping machine. The relative movement is between operating positions which include at least a production position and an interchanging position, respectively. In the production position of the filling tube and the casing brake unit, the brake body is in braking position and the filling tube is arranged at the clipping machine for the filling process of the packaging casing. In at least one operating position of the filling tube and the casing brake unit, the brake body is moveable along the filling tube axis to a releasing position. In the interchanging position of the filling tube and the casing brake unit, the brake body can obtain the releasing position, wherein, in the releasing position, the brake body is arranged off the filling tube. Thus, the filling tube and/or the casing brake unit or at least the brake body can be exchanged easily and/or the packaging casing can be replaced readily.

The present invention as described above, provides the additional advantage that the filling tube can be brought in a further operating position which can be dated as interchanging position. In this interchanging position the filling tube is moved further away from the clipping machine by, for example, a pivoting movement. In the exchanging position the exhausted packaging casing material can be replaced by a new casing material wherein this exchange can be done easily by shifting the new packaging casing from the filling end of the filling tube onto the filling tube. Moreover, in the exchanging position, the filling tube can be exchanged in case that a sausage-shaped product having a different diameter at the previous one, shall be manufactured.

According to the invention, it is preferred that the bearing device comprises a hinge for allowing the casing brake unit being pivotally arranged at the clipping machine at least between the production position and the interchanging position, and a calotte-shaped adapter for allowing the filling tube being pivotally arranged at the clipping machine at least between the production position, the interchanging position and an exchanging position. Preferably, these means are configured for pivotally arranging the filling tube and the casing brake unit at the clipping machine having the same pivot axis. More preferably, the hinge allows a pivoting action of the casing brake from the production position to the interchanging position only and the calotte-shaped adapter allows a pivoting action of the filling tube from the production position to the interchanging position and to an exchanging position that is obtainable by moving the filling tube beyond the interchanging position. Alternatively, the exchanging position could be obtainable by a pivoting action of the filling tube around a pivot axis that is crosswise, preferably perpendicular, to the pivot axis of the casing brake unit. In that case, the calotte-shaped adapter allows pivoting actions around different pivot axes.

Preferably, the mutual movement of the brake body and the filling tube is actuated by a drive device. Such drive device may comprise an electric motor, a pressure cylinder with a piston rod and/or a cam-drive system. Advantageously the drive device comprises a pneumatic cylinder. Alternatively, the mutual movement of the brake body and the filling tube can be generated manually.

It is preferred that the casing brake unit and the filling tube are pivotally moveable around a pivot axis and relative to the clipping machine when mounted to the mounting unit. Preferably, the pivot axis is vertical. This has the advantage, that the operator of the clipping machine can easily pivot casing brake unit and filling tube away from clipping machine without the need of lifting or balancing any machine component. In an alternative embodiment of the invention, the casing brake unit and filling tube are linearly moveable relative to the clipping machine along a guide rail preferably arranged horizontally or vertically that is mounted to the clipping machine.

According to a preferred embodiment of the inventive filling assembly, the casing brake unit comprises a brake holder unit having a brake holder and a brake holder guide, wherein the brake body is arranged at the brake holder and the brake holder guide is arranged at a moveable part of the mounting unit that is relatively moveable to the clipping machine. Between the interchanging position and the production position of the casing brake unit and the filling tube, the brake holder is at least moveable relative to the brake holder guide in a direction parallel to the brake axis between the braking position and the releasing position. Preferably, the brake holder and the brake holder guide are interconnected with a bearing or bushing for allowing said relative translational movement of the brake holder to the brake holder guide.

It is further preferred that the filling assembly comprises locking means for holding the casing brake unit in the interchanging position relative to the clipping machine. This feature has the advantage that, while the casing brake unit is fixed in the interchanging position, an operator can move the filling tube from the interchanging position to another position, like the exchanging position, in which the filling tube can be removed from the mounting unit and the removal of the brake body is enabled or eased and/or the consumed packaging casing can be replaced. During these pro-cesses, the casing brake unit will remain fixed in the interchanging position.

Further preferred, the locking means are configured for being engaged when the brake body is in the releasing position and the interchanging position and for being disengaged when the brake body is in the braking position and/or production position. According to this feature, it is ensured that the casing brake unit is at least locked in the interchanging position when the filling tube is removable from the mounting unit of the clipping machine and/or the consumed packaging casing is replaced.

In a preferred embodiment of the invention, the locking means comprise a first tapered part located at the brake holder and a corresponding second tapered part located at a holding section of the mounting unit that is fixedly attachable to the clipping machine. The locking means is engaged when the first tapered part is engaged with the second tapered part, and disengaged when the first tapered part is disengaged from the second tapered part. An advantage of using tapered locking means is that in case the casing brake unit has an offset relative to the interchanging position, the casing brake unit is moveable to the interchanging position by the tapered parts of the locking means during a process of engaging the locking means. Consequently, when the locking means are engaged, the offset is neutralized and the casing brake unit is in interchanging position. Alternatively, the brake holder may comprise a cam or the like configured for engaging a guiding path or the like of the filling assembly for synchronising the movement of the casing brake unit and the filling tube between the production position and the interchanging position with the movement of the brake body between the locking position and the releasing position.

Moreover, according to the inventive filling assembly, the brake holder comprises an adapter device that is configured to adjust the length of the brake holder to fit the casing brake unit to the length of a respective filling tube. The adapter device may comprise a tube, rod and/or plate and may be replaceable by another adapter of a different length corresponding to the length of a respective filling tube. Alternatively the adapter may comprise a scissor-like construction or a threaded bar in cooperation with a nut. At least the adapter is configured for adjusting the length of the brake holder or the distance between the brake body and the brake holder guide.

It is preferred that a stopper means is arranged at the brake holder, wherein the stopper means is configured to engage with a corresponding stopper surface of the clipping machine when the brake body is in the braking position and the casing brake unit is in the production position, thus avoiding the brake body from being moved along the filling tube axis. To reach this target, it is preferred that the stopper means is fixedly mounted at the brake holder and the corresponding surface is fixedly mounted at the clipping machine, e.g. at a bracket of the clipping machine. In this configuration, the brake body has to be moved to the braking position first, before the casing brake unit and the filling tube can be moved to the production position to enable an engagement of the stopper means with the corresponding surface of the clipping machine.

In a preferred embodiment of the invention, a holder sensor and a casing brake sensor are provided for detecting at least one position of the brake holder relative to the brake holder guide and for detecting at least one position of the casing brake unit relative to the clipping machine. Consequently, signals received from the holder sensor can provide information about the position of the brake body relative to the filling tube, especially if the brake body is in braking position and/or releasing position. Preferably, the casing brake sensor is configured for detecting at least the interchanging position of the casing brake unit relative to the clipping machine. It is preferred that the casing brake sensor and holder sensor are embodied in a single sensor, configured and located at the clipping machine or filling assembly for executing the duty of both sensors.

Moreover, according to the invention, it is preferred that a filling tube sensor is provided for detecting at least one position of the filling tube relative to the clipping machine. Advantageously, the filling tube sensor is configured for detecting the filling tube at least when the casing brake unit and the filling tube are in the interchanging position relative to the clipping machine. By this means, it is detectable when the filling tube is removed from the filling assembly. Furthermore, it is detectable when a filling tube is (re-)assembled to the filling assembly. Consequently, the signal from the filling tube sensor can be used for initiating an automatic process of moving the brake body from the releasing position into the braking position subsequently to the mounting of the filling tube onto the filling assembly.

It is preferred that a mounting assembly is provided for mounting the filling assembly to a bracket of the clipping machine. The mounting assembly can comprise a first mounting plate and a second mounting plate configured for embedding and being interlocked with the bracket. Preferably, the first mounting plate is arranged at the moveable part of the mounting unit or is an integral part of the mounting unit Preferably, the filling tube assembly comprises a crabbing means for securing the filling tube holder with the inserted filling tube from pivoting away from the casing brake unit, when the filling tube axis and the brake axis are parallel. The crabbing means can be configured for directly engaging with the filling tube holder and the moveable part of the mounting unit. Preferably, crabbing means is at least engageable between the production position and the interchanging position and at least disengageable when the brake body is in the releasing position. It is further preferred that crabbing means is actuated by an automatic actuating means, e.g. a pneumatic actuator, that is controlled by the control device. For that purpose, control device can be configured for disengaging crabbing means when the casing brake sensor starts not sensing the brake holder anymore and engages the crabbing means when the filling tube sensor starts sensing the filling tube or the filling tube holder, respectively.

Furthermore, the aforementioned problem is solved by a clipping machine for filling and closing tubular or bag-shaped packaging casing comprising a filling assembly according to any of claims 1 to 14.

Further advantageous and preferred embodiments of the filling assembly will be described in the following together with the drawings listed below. The expressions "left", "right", "below" and "above" used in the following description, are referred to the drawings in an alignment such that the reference numbers and the notations of the figures used can be read in normal orientation.

DETAILED DESCRIPTION

Figure 1:
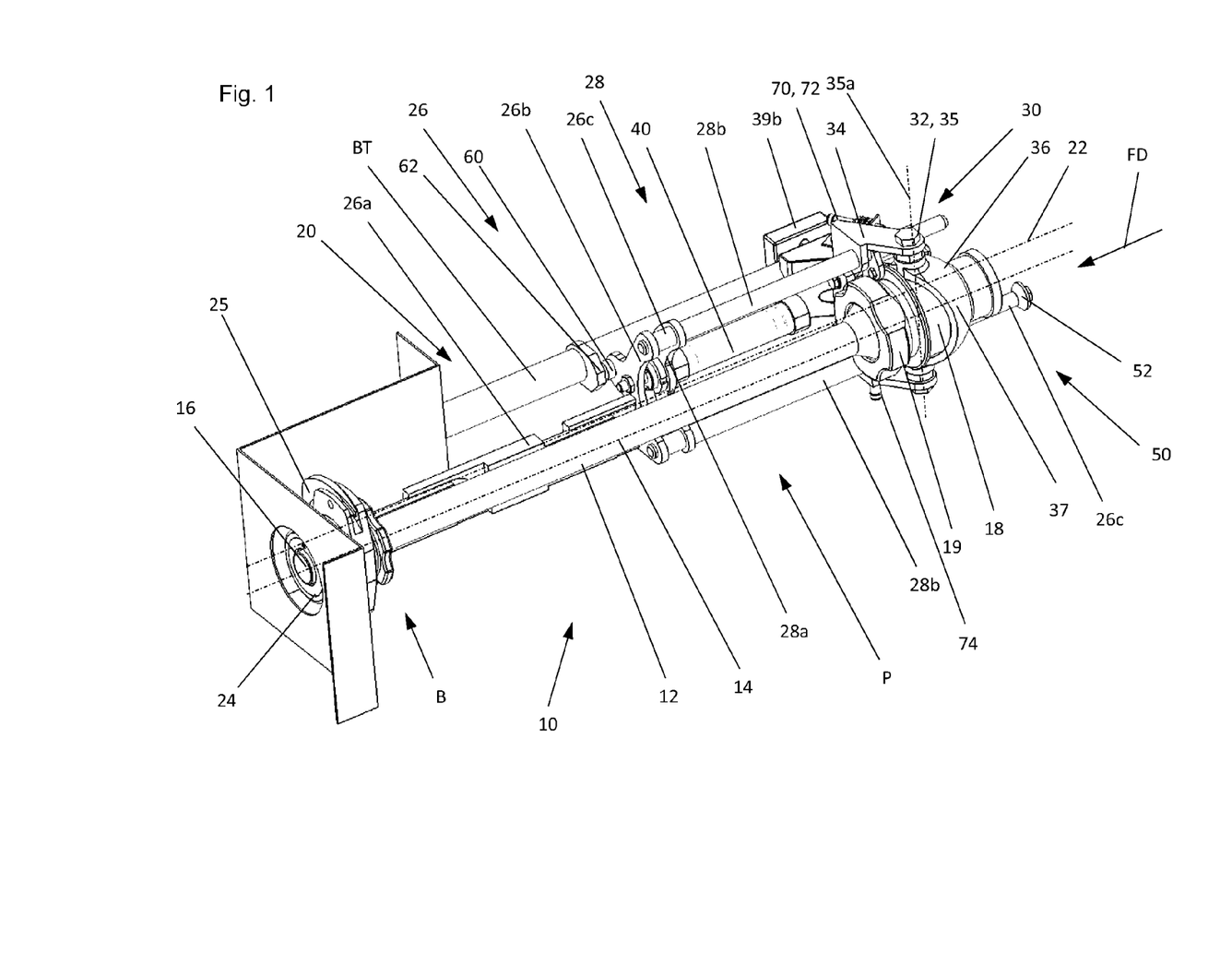
FIG. 1 is a schematic and perspective view from a first perspective of a filling assembly according to the present invention, wherein a filling tube and a casing brake unit are in a production position and a brake body is arranged in a braking position.
Figure 2:
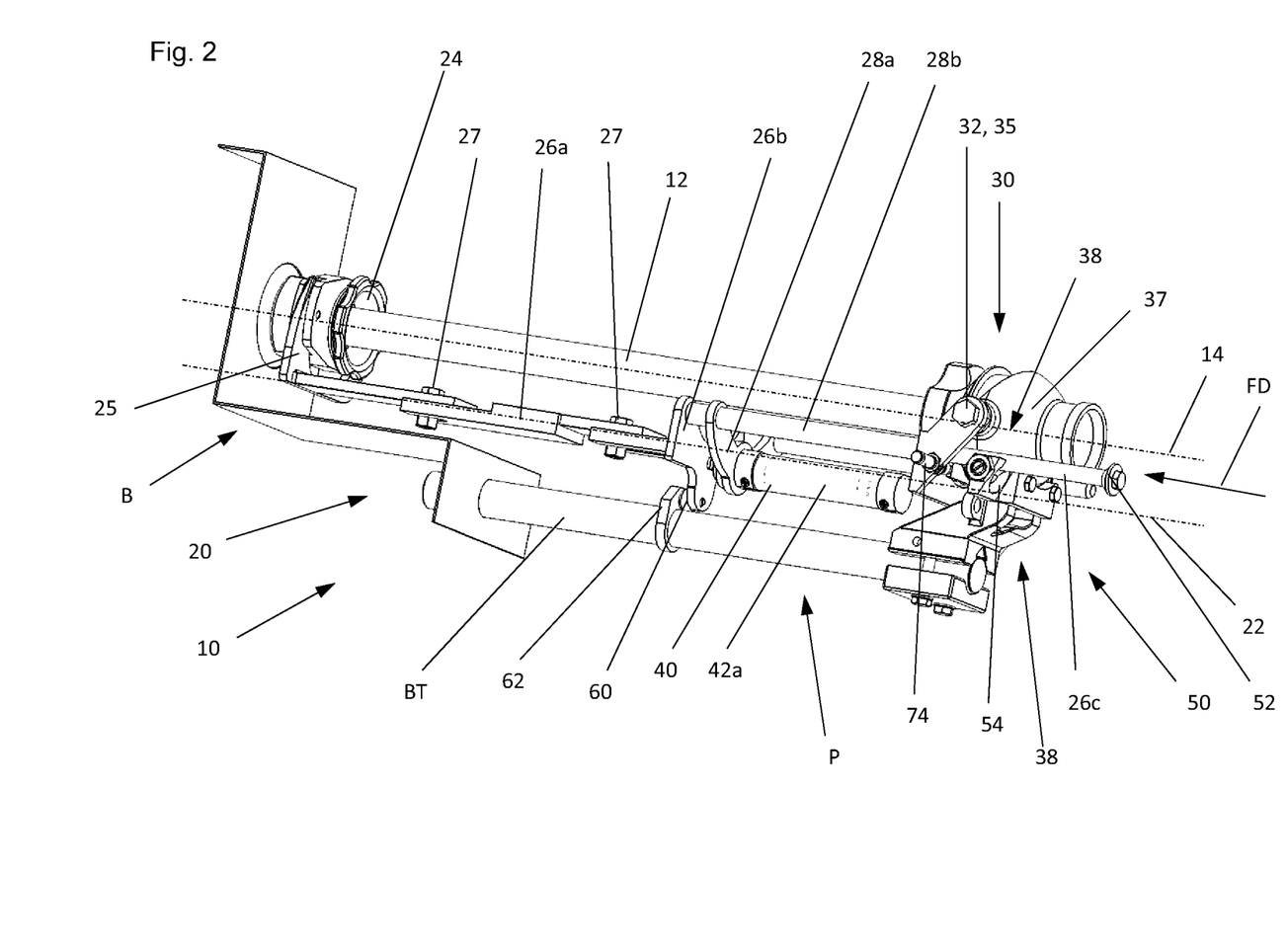
FIG. 2 is a schematic and perspective view from a second perspective of the filling assembly according to the invention, wherein the filling tube, the casing brake and the brake body are arranged in the same positions as shown in FIG. 1.

Referring to FIGS. 1 and 2, a filling assembly 10 is mounted to a bracket BT of a not shown clipping machine for producing sausage-shaped products, like sausages. The bracket BT in the shown embodiment has a tubular shape and extends parallel to a feeding direction FD of the clipping machine. Alternatively, the bracket BT could have the shape of a substantially flat mounting plate or the like. In the presented embodiment, the filling assembly 10 comprises a filling tube 12 with a filling tube axis 14 and a filling tube outlet 16, a casing brake unit 20 with a brake axis 22 and a mounting unit 30. In an alternative, not shown embodiment, mounting unit 30 is not a part of filling assembly 10, wherein bracket BT of the clipping machine substantially has the same shape as mounting unit 30 as shown in FIGS. 1 and 2. In that particular embodiment, filling tube 12 and casing brake unit 20 of filling assembly 10 could be mounted to the bracket BT of the clipping machine directly.

Casing brake unit 20 comprises a brake body 24, a brake frame 25, a brake holder 26 and a brake holder guide 28. Brake holder 26 and brake holder guide 28 both extending along brake axis 22. Brake holder 26 is relatively moveable to brake holder guide 28 along brake axis 22 between a braking position B and a releasing position R. In braking position B, brake body 24 is arrangeable for encasing a part of filling tube 12 that is adjacent to filling tube outlet 16. In releasing position R, brake body 24 is not encasing any part of filling tube 12. As illustrated in FIGS. 1 and 2, casing brake unit 20 is in braking position B and together with filling tube 12 in a production position P. In production position P of casing brake unit 20, brake axis 22 is parallel to feeding direction FD.

In the embodiment as illustrated in FIG. 1, brake holder 26 comprises an adapter device 26a, a holder plate 26b with two opposing main surfaces and two holder rods 26c. Holder rods 26c are arranged one upon the other mutually spaced apart, wherein one holder rod 26c is arranged above filling tube 12 and the other holder rod 26c is arranged below filling tube 12. Adapter device 26a and holder rods 26c are extending parallel to brake axis 22, and the main surfaces of holder plate 26b are oriented perpendicular to brake axis 22. An end of adapter device 26a that is pointing upstream feeding direction FD is attached to the main surface of holder plate 26b that is facing downstream feeding direction FD. The ends of holder rods 26c that are pointing downstream feeding direction FD are attached to the main surface of holder plate 26b that is facing upstream feeding direction FD. Holder plate 26b has a semicircular recess with a recess axis that is about similar to filling tube axis 14, when casing brake unit 20 is in production position P as illustrated in FIGS. 1 and 2.

To adjust filling assembly 10 to filling tubes 12 of different lengths, adapter device 26a is configured for being adjustable in length. As visible in FIG. 2, in this embodiment, adapter device 26a comprises three overlapping plates arranged along braking axis 22, wherein each plate is overlapping with at least one of the other two plates in an overlapping area. Each two overlapping plates are fixed together by a screw 27 in an overlapping area, respectively. For adjusting the length of adapter device 26a, at least one of the overlapping plates comprises a long hole with a long side parallel to brake axis 22. Screw 27 is loosenable for enabling a relative movement of the overlapping plates of adapter device 26a along brake axis 22. In an alternative embodiment, instead of or in addition to a long hole, at least one of the overlapping plates can comprise a plurality of holes.

Brake holder guide 28 comprises a guide plate 28a with two opposing main surfaces and two guide tubes 28b. Guide tubes 28b are extending parallel to brake axis 22, and having longitudinal axes that are arranged inline with respective longitudinal axes of holder rods 26b. The main surfaces of guide plate 28a are oriented perpendicular to brake axis 22. The ends of guide tubes 28b that are pointing downstream feeding direction FD are attached to the main surface of guide plate 28a that is facing upstream feeding direction FD. Guide plate 28a is substantially congruent with holder plate 26b and is arranged upstream and inline with holder plate 26b with respect to the feeding direction FD. Hence, filling tube 12 is partly encased by holder plate 26b and guide plate 28a.

Each holder rod 26c of brake holder 26 is inserted into a respective guide tube 28b of brake holder guide 28 for being relatively moveable in a direction parallel to brake axis 22. In braking position B, the ends of holder rods 26c that are pointing upstream feeding direction FD project from the respective ends of guide tube 28b that a pointing upstream feeding direction FD. The surfaces of holder rods 26c and guide tube 28b that are engageable with each other may be coated, comprise a bushing and/or bearing and/or may be lubricated for ensuring a smooth relative movement of brake holder 26 and brake holder guide 28.

The end of guide tube 28b that is pointing upstream feeding direction FD is fixed to a moveable part 34 of mounting unit 30. Moveable part 34 is pivotable around a pivot axis 35a of a bearing device 32 at least between production position P and an interchanging position I. Consequently, casing brake unit 20 is pivotable arranged at moveable part 34 of mounting unit 30 for pivoting relatively to a stationary part 36 of mounting unit 30 at least between production position P and interchanging position I. It is preferred that casing brake unit 20 is pivotable between production position P and interchanging position I, only. In the shown embodiment, bearing device 32 is designed as a hinge 35.

Brake body 24 is releasably fixed to a brake frame 25 of casing brake unit 20. Brake frame 25 is substantially c-shaped for partly encasing brake body 24 and is fixedly arranged an end of adapter device 26a that is pointing downstream feeding direction FD. When brake body 24 is inserted in brake frame 25, it can be secured to brake frame 25 by securing means, e.g. a locking nut, a locking screw, a locking pin or an elastic clip that is engageable with a respective recess of brake frame 25.

Filling tube 12 is coupled with one end that is pointing upstream feeding direction FD to a filling tube connector 18. Filling tube connector 18 is pivotally arranged in a calotte-shaped adapter 37 of mounting unit 30 for pivoting around pivot axis 35a. In this embodiment, filling tube 12 and filling tube connector 18 are separate parts that are mutually releasably fixed by a fixation nut 19. In an alternative embodiment according to the invention, filling tube connector 18 could be an integral part of filling tube 12. In order to prevent filling material leaking from filling assembly 10 during a filling process, the junctions between filling tube 12, filling tube connector 18 and/or calotte-shaped adaptor 37 are preferably provided with seals for clogging filling assembly 10.

An area of filling tube 12 that is close to filling tube outlet 16 is inserted in brake body 24 of casing brake unit 20. According to FIGS. 1 and 2, brake body 24 is in braking position B. Consequently, in this state, filling tube axis 14 is parallel to brake axis 22. Filling tube 12 and casing brake unit 20 are in production position P. In braking position B, filling tube 12 and casing brake unit 20 are pivotable around pivot axis 35a together as a group.

A stopper means 60 with a bumper area is arranged at holder plate 26b of brake holder 26. The bumper area of stopper means 60 can comprise soft material, e.g. rubber, and is engaged with a corresponding stopper surface 62 attached to bracket BT of the clipping machine. Consequently, stopper means 60 and stopper surface 62 are configured for preventing a movement of holder plate 26b in direction of filling tube outlet 16 along brake axis 22. Hence, due to the engagement of stopper means 60 with stopper surface 62, brake body 24 is kept in braking position B. Alternatively, stopper surface 62 can comprise a bumper area for engaging stopper means 60.

Figure 3:
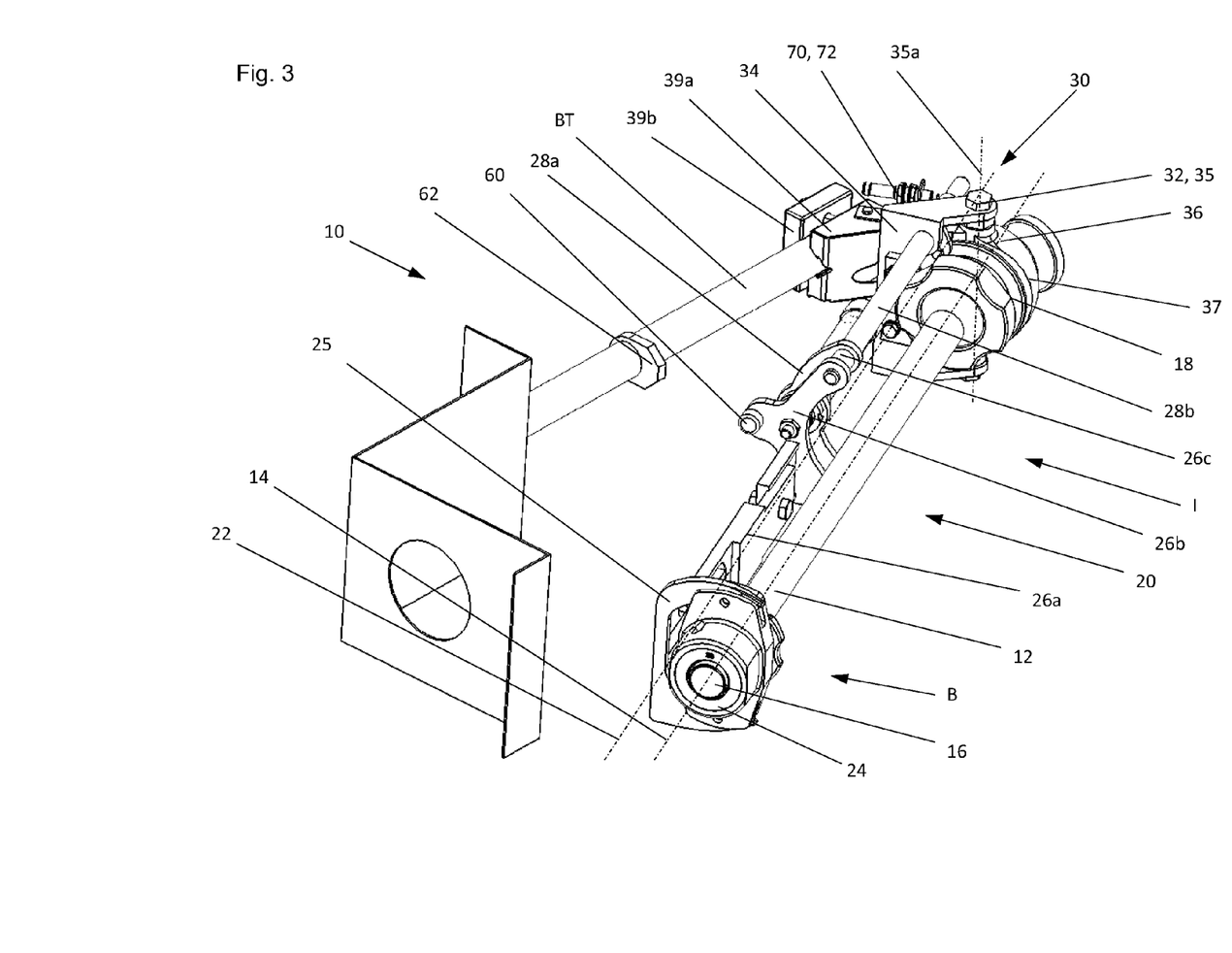
FIG. 3 is a schematic and perspective view from the first perspective of the filling assembly according to FIG. 1, wherein the filling tube and the casing brake unit are in an interchanging position and the brake body is arranged in braking position.
Figure 4:
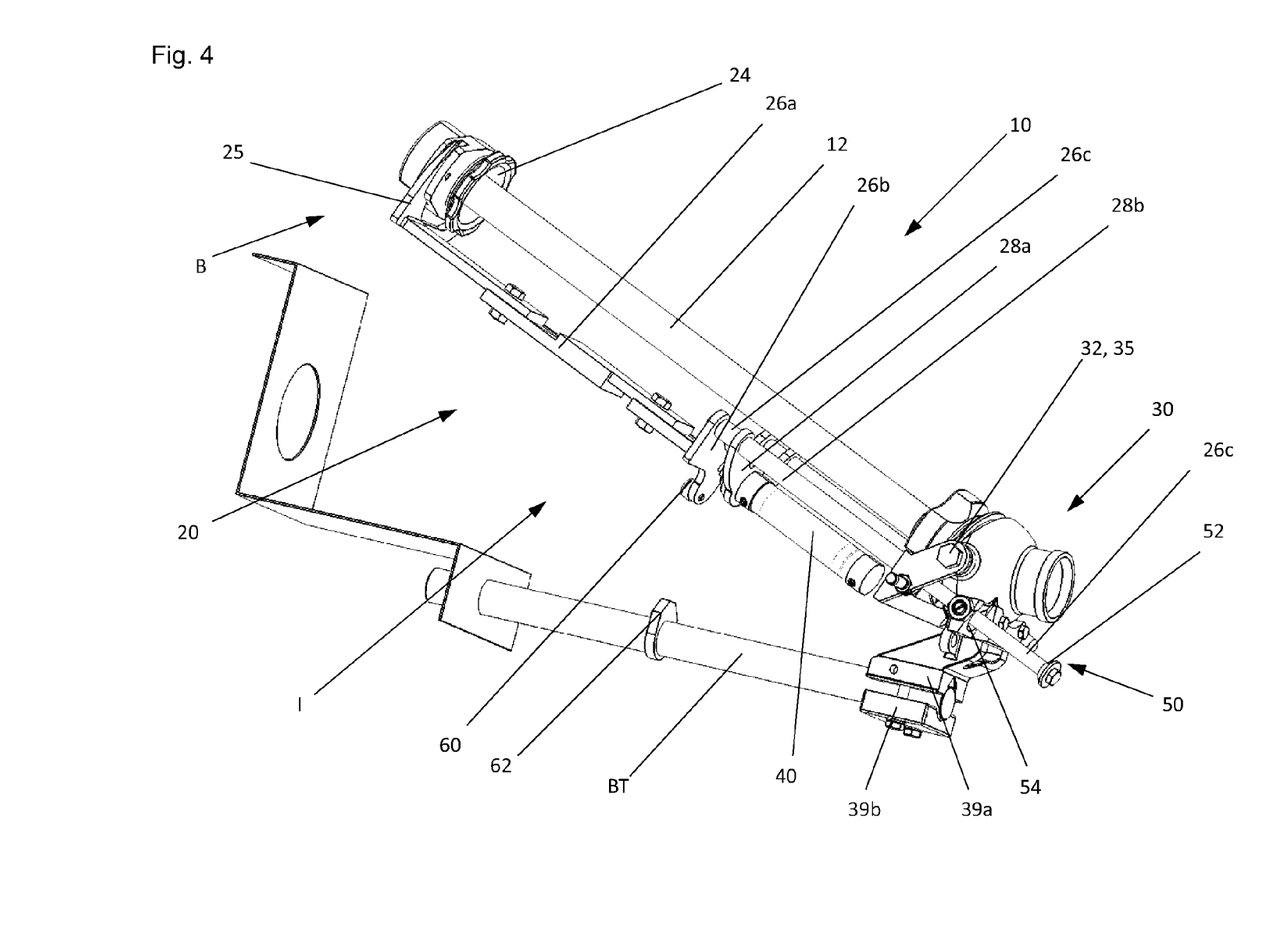
FIG. 4 is a schematic and perspective view from the second perspective of the filling assembly according to the invention, wherein the filling tube, the casing brake and the brake body are arranged in the same positions as shown in FIG. 3.

The connection of mounting unit 30 to bracket BT of the clipping machine is better visible in FIGS. 3 and 4. Mounting unit 30 comprises a first mounting plate 39a and a second mounting plate 39b, wherein bracket BT of the clipping machine is arranged in between first mounting plate 39a and second mounting plate 39b. First mounting plate 39a and second mounting plate 39b are interlocked with bracket BT by not illustrated interlocking means, thus fixing mounting unit 30 to bracket BT. To improve the interlocking of first mounting plate 39a and second mounting plate 39b with bracket BT first mounting plate 39a and/or second mounting plate 39b may comprise a recess, configured for embedding bracket BT when the respective sides of first mounting plate 39a and second mounting plate 39b are facing each other. Preferably, the recess of first mounting plate 39a and/or second mounting plate 39b may have a v-shaped and/or semicircular cross-section, wherein the diameter of the semicircular cross-section preferably equals the outer diameter of bracket BT.

According to FIGS. 3 and 4, filling tube 12 and casing brake unit 20 are shown in an interchanging position I that is obtained by pivoting filling tube 12 and casing brake unit 20, e.g. starting from production position P, around pivot axis 35a of hinge 35. In the state illustrated in FIGS. 3 and 4, filling tube axis 14 is still parallel to brake axis 22. Brake body 24 is still in braking position B, encasing the part of filling tube 12 that is adjacent to filling tube outlet 16.

As shown in FIG. 3, filling assembly 10 further comprises a holder sensor 70 which is arranged at stationary part 36 of mounting unit 30 for sensing the position of one of the holder rods 26c of brake holder 26. In the presented example, holder sensor 70 is configured to sense the end of one of the holder rods 26c that is pointing upstream feeding direction FD and is projecting from the respective end of guide tube 28b that is pointing upstream feeding direction FD, when casing brake unit 20 is in interchanging position I, as shown in FIGS. 3 and 4, and brake body 24 is not in releasing position R. In releasing position R, that respective end of holder rod 26c is moved out of the range of holder sensor 70 and is protruding from less from guide tube 28b. Hence, in the state illustrated in FIGS. 3 and 4, holder sensor 70 will detect holder rod 26c.

As shown in FIG. 4, locking means 50 are provided for locking casing brake unit 20 in interchanging position I. Locking means 50 comprises a first tapered part 52 with a taper and a corresponding second tapered part 54 with a respective tapered recess. First tapered part 52 is provided at the end of one of the holder rods 26c that is pointing upstream feeding direction FD (cf. FIG. 2), wherein the taper of first tapered part 52 is pointing downstream feeding direction FD. Second tapered part 54 is arranged at a holding section 38 of stationary part 36 of mounting unit 30, wherein a side of second tapered part 54 having the tapered recess is facing upstream feeding direction FD (cf. FIG. 2) and in a direction towards first tapered part 52. In the illustrated state, first tapered part 52 and second tapered part 54 are spaced apart along brake axis 22, therefore, locking means 50 is not engaged.

Figure 5:
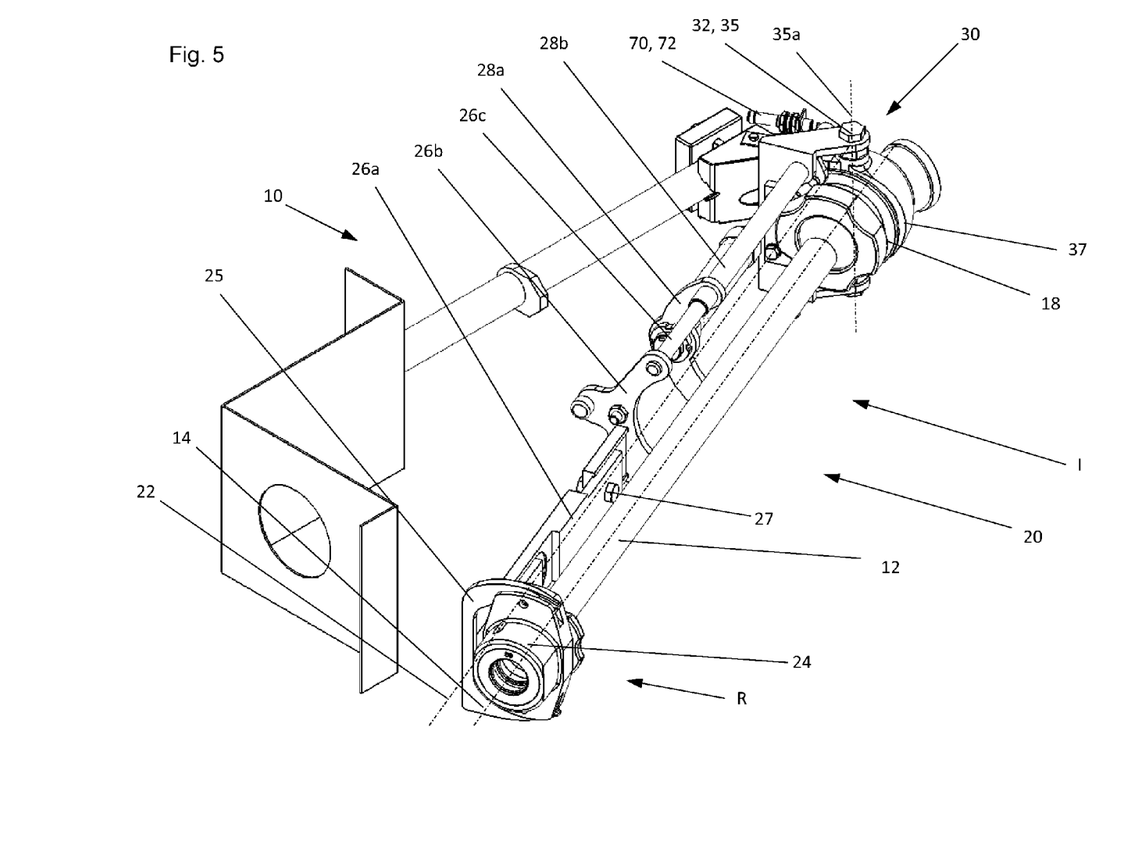
FIG. 5 is a schematic and perspective view from the first perspective of the filling assembly according to FIG. 1, wherein the filling tube and the casing brake unit are in interchanging position and the brake body is arranged in a releasing position.
Figure 6:
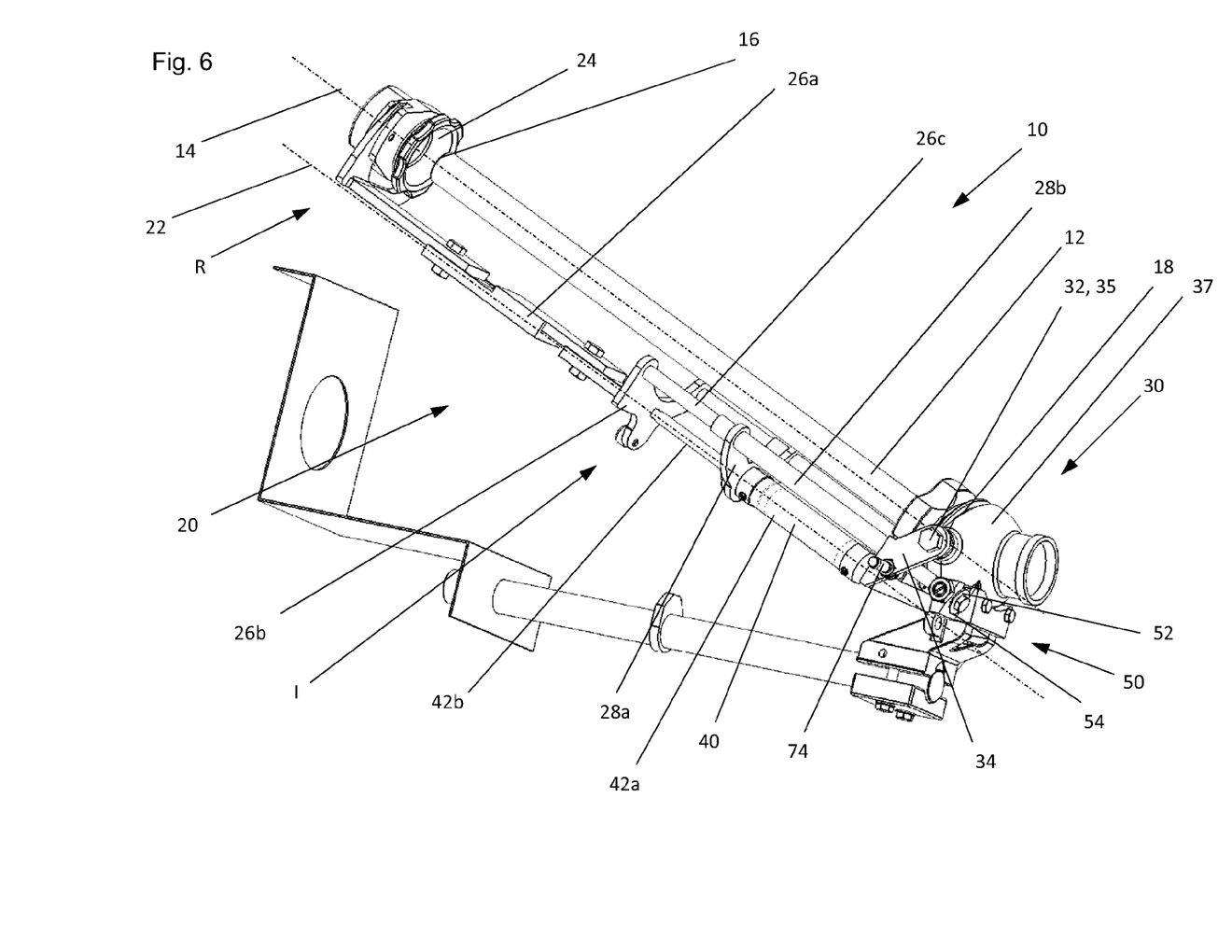
FIG. 6 is a schematic and perspective view from the second perspective of the filling assembly according to the invention, wherein the filling tube, the casing brake and the brake body are arranged in the same positions as shown in FIG. 5.

Referring to FIGS. 5 and 6, filling tube 12 and casing brake unit 20 are still in interchanging position I. Brake body 24 and brake holder 26 are arranged in releasing position R. In releasing position R, the ends of holder rods 26c that are pointing upstream feeding direction FD (cf. FIG. 2) are protruding less from guide tubes 28b than in braking position B. Furthermore, in releasing position R, first tapered part 52 is encased from second tapered part 54, wherein, in the illustrated embodiment, the taper of first tapered part 52 is circumferentially contacting the respective tapered recess of second tapered part 54. Thus, locking means 50 is engaged and fixes casing brake unit 20 in interchanging position I.

As also illustrated in FIGS. 5 and 6, in releasing position R, brake body 24 is not encasing any part of filling tube 12 anymore. A casing brake sensor 72 is attached to the stationary part 36 of mounting unit 30 and is configured to sense the part of one of one of the holder rods 26c that is projecting from guide tube 28b and facing upstream feeding direction FD (cf. FIG. 2) in braking position B. In releasing position R, that part of holder rod 26c is projecting less from guide tube 28b and is out of the range of casing brake sensor 72. Therefore, that part of holder rod 26c is not detectable by casing brake sensor 72 in the illustrated releasing position R. In this embodiment of the invention, holder sensor 70 and casing brake sensor 72 are designed as one sensor, only. Alternatively, at least one holder sensor 70 and at least one separate casing brake sensor 72 can be provided. In the configuration shown in FIGS. 5 and 6, filling tube axis 14 and brake axis 22 are still mutually parallel. For preventing filling tube 12 pivoting against casing brake unit 20 when brake body 24 is in releasing position R, fixation nut 19 of filling tube connector 18 abuts moveable part 34 of mounting unit 30 when filling tube axis 14 and brake axis 22 are parallel, e.g. when filling tube 12 and casing brake unit 20 are in interchanging position I.

Furthermore, as shown best in FIG. 6, a drive device 40 is provided at the casing brake unit 20. The drive device 40 comprises a drive cylinder 42a and a drive rod 42b. An end of drive cylinder 42a that is pointing downstream feeding direction FD (cf. FIG. 2) is fixedly arranged at the main surface of guide plate 28a that is facing upstream feeding direction FD (cf. FIG. 2). An end of drive rod 42b that is pointing downstream feeding direction FD (cf. FIG. 2) is fixedly arranged at the main side of holder plate 26b that is facing upstream feeding direction FD (cf. FIG. 2). Thus, the relative movement of brake holder 26 and brake holder guide 28 is conducted and controlled by drive device 40. Consequently, brake body 24 is moveable onto and off filling tube 12 by drive device 40. In the illustrated embodiment, drive device 40 is a fluid driven pressure cylinder, preferably a pneumatic cylinder.

Moreover, FIG. 6 shows a filling tube sensor 74 which is arranged at moveable part 34 of mounting unit 30 for sensing the position of filling tube connector 18 of filling tube 12. Filling tube sensor 74 may be configured for detecting the filling tube connector 18, only when filling tube connector 18 is inserted in calotte-shaped adapter 37 and filing tube axis 14 is parallel to brake axis 22. Preferably, filling tube sensor 74 is configured to detect filling tube connector 18 in interchanging position I, only. In an alternative, not shown, embodiment, filling tube sensor 74 can be arranged for detecting filling tube 12. Preferably, in that alternative embodiment, filling tube 12 is detected when filling tube 12 is in any operating position between production position P and interchanging position I.

Figure 7:
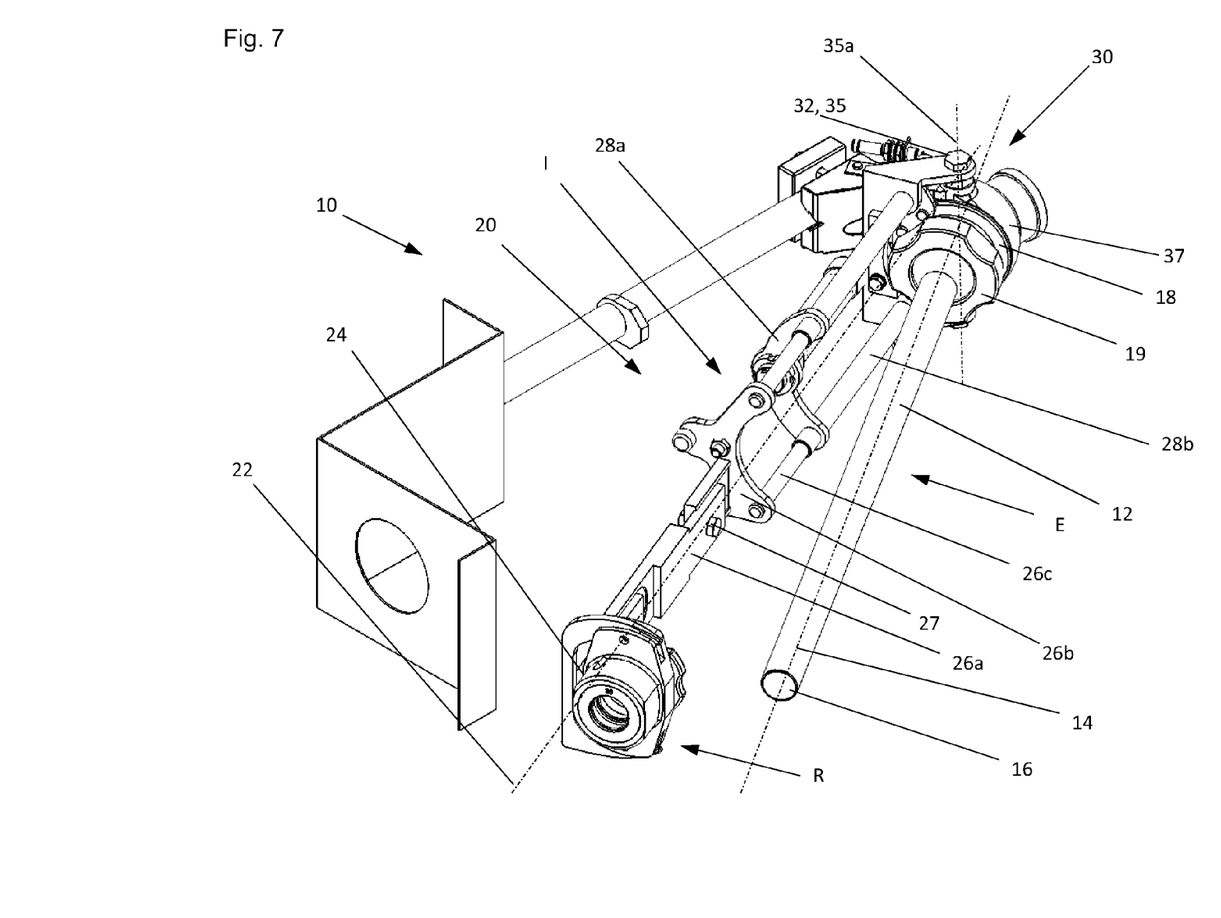
FIG. 7 is a schematic and perspective view from the first perspective of the filling assembly according to FIG. 1, wherein the casing brake unit is in interchanging position, the brake body is in releasing position and the filling tube is in an exchanging position, pivoted away from the casing brake unit.
Figure 8:
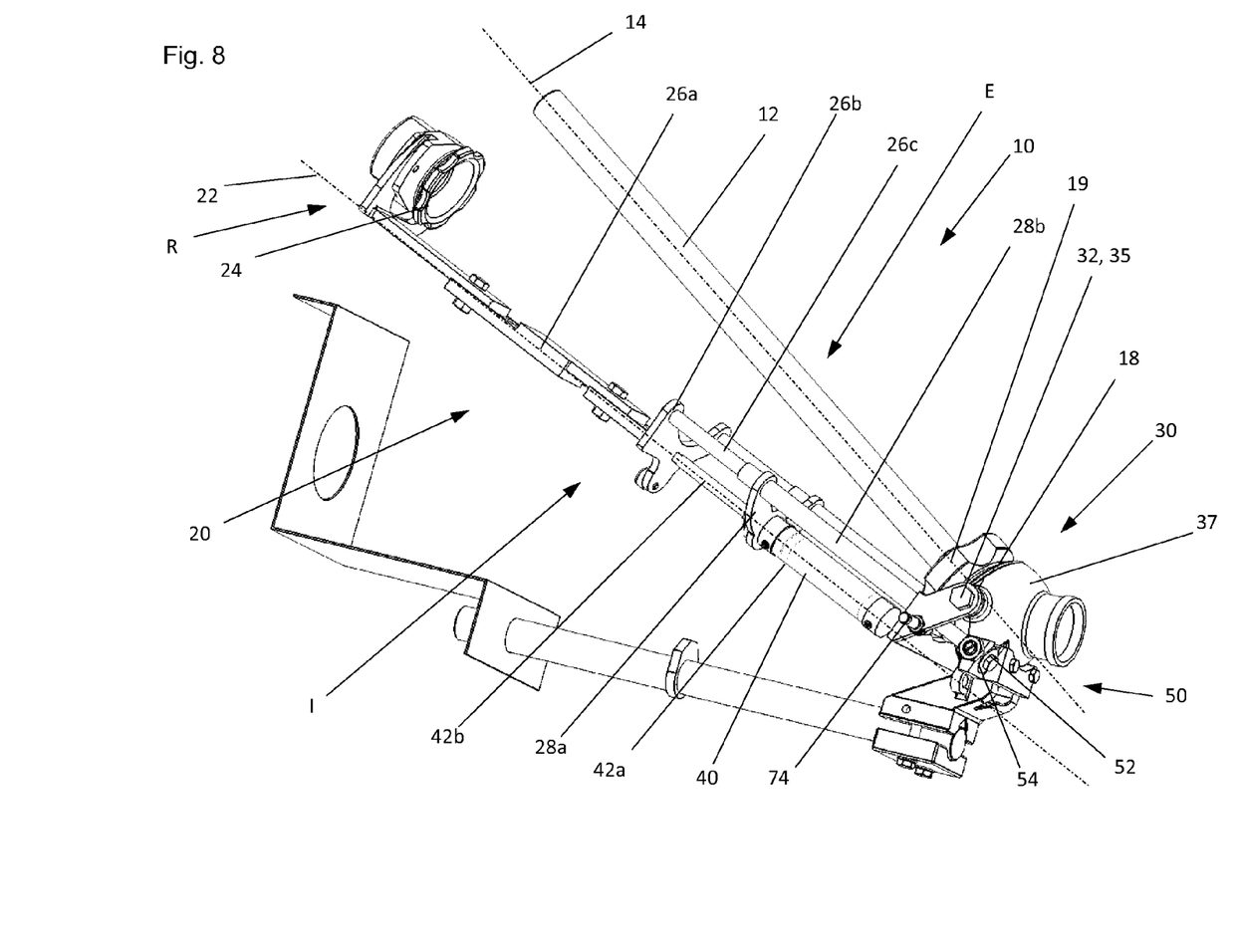
FIG. 8 is a schematic and perspective view from the second perspective of the filling assembly according to the invention, wherein the filling tube, the casing brake and the brake body are arranged in the same positions as shown in FIG. 7.

With respect to FIGS. 7 and 8, casing brake unit 20 of filling assembly 10 is still locked by locking means 50 in interchanging position I and arranged in releasing position R as well. In contrast to the configuration shown in FIGS. 5 and 6, in FIGS. 7 and 8 filling tube 12 is pivoted around pivot axis 35a relative to the clipping machine and casing brake unit 20 in a direction away from production position P and interchanging position I to an exchanging position E. Therefore, filling tube axis 14 and brake axis 22 are not parallel anymore and filling tube connector 18 is not detectable by filling tube sensor 74 anymore.

In the exchanging position E, filling tube 12 is detachable from filling tube connector 18 arranged in calotte-shaped adapter 37 of mounting unit 30 after fixation nut 19 has been loosened or removed from mounting unit 30. Subsequently, filling tube 12 has to be moved along filling tube axis 14 in a direction away from mounting unit 30. Alternatively, filling tube 12 and filling tube connector 18 could be detachable form calotte-shaped adapter 37 together as a unit. Consequently, in the position illustrated in FIGS. 7 and 8, filling tube 12 is removable from filling assembly 10 and replaceable by another filling tube 12. The dimensions of the replacement filling tubes 12, especially length, inner and outer diameter, can be varied within the adaptability range of filling assembly 10.

Further, filling assembly 10 can comprise a not illustrated crabbing means for securing filling tube holder 18 with inserted filling tube 12 from pivoting away from casing brake unit 20, when filling tube axis 14 and brake axis 22 are parallel. The crabbing means can be configured for directly engaging with filling tube holder 18 and moveable part 34 of mounting unit 30. Preferably, crabbing means is engageable between production position P and interchanging position I and disengageable when brake body 24 is in releasing position R. Crabbing means can be actuated by an automatic actuating means, e.g. a pneumatic actuator, that is controlled by control device 44, wherein preferably, control device 44 can control the engaging or disengaging of the crabbing means dependent on a signal that is generated by casing brake sensor 72.

For adjusting filling assembly 10 to filling tubes 12 of different outer diameters, brake body 24 is preferably configured for varying the diameter of its inner duct for encasing a respective part of filling tube 12. Alternatively, brake body 24 can be replaced by a suitable brake body 24. By these means, filling assembly 10 provides a solution for quickly replacing the filling tube 12 of a clipping machine and adjusting the clipping machine to filling tubes 12 of different dimensions.

Description of Sensor and Drive Assisted Removing Process

According to the invention, the removing process of the filling tube 12 from filling assembly 10 can be supported by a, not illustrated, control device 44 with respect to at least one position detected by holder sensor 70, casing brake sensor 72 and filling tube sensor 74. For better understanding, in the following it is defined that if a sensor detects the object to be detected, the sensor will generate the output signal "1" in all other cases the sensor will not generate an output signal or, alternatively, generate the output signal "0".

Referring to FIGS. 1 and 2, filling assembly 10 of clipping machine is in production position P and brake body 24 in braking position B. Crabbing means is preferably engaged with filling tube holder 18 and moveable part 34, thus preventing a relative movement of these parts. From this initial position the replacement process can be started. At this point, holder sensor 70 and casing brake sensor 72 each generate signal "0" and filling tube sensor 74 may generate an arbitrary signal, preferably "0". According to the invention, filling tube sensor 74 may also be configured for generating, in the state of FIGS. 1 and 2, signal "1" when filling tube 12 is mounted to filling assembly 10 and "0" when no filling tube 12 is present.

For replacing filling tube 12, the operator has to pivot filling tube 12 together with casing brake unit 20 around pivot axis 35a from production position P to interchanging position I as shown in FIGS. 3 and 4. During that movement, stopper means 60 and stopper surface 62 are being disengaged, thereby enabling a relative movement of brake holder 26 and brake holder guide 28, and consequently, a movement of brake body 24 from braking position B along brake axis 22 in direction of releasing Position R.

As soon as filling tube 12 and casing brake unit 20 reach interchanging position I, as shown in FIGS. 3 and 4, holder sensor 70 will start generating signal "1" as long as brake body 24 is still in braking position B. The control device 44 is configured such that when receiving signal "1" from holder sensor 70, moving of brake body 24 along brake axis 22 from braking position B to releasing position R will be initiated. In braking position B, casing brake sensor 72 generates signal "1". Casing brake sensor 72 will generate signal "1" as long as casing brake unit 20 is in interchanging position I and brake body 24 is not in releasing position R.

FIGS. 5 and 6 show filling assembly 10 with casing brake unit 20 and filling tube 12 in interchanging position I and brake body 24 of casing brake unit 20 in releasing position R. In this illustrated position, holder sensor 70 and casing brake sensor 72 generate signal "0" and filling tube sensor 74 generates signal "1". In this working condition of filling assembly 10, control device 44 will stop the movement of brake body 24 along brake axis 22. As soon as casing brake sensor generates signal "0", control device 44 actuates crabbing means disengaging from filling tube holder 18 and moveable part 34 of mounting unit 30. Filling tube 12 is now further pivotable by the operator around pivot axis 35a away from casing brake unit 20 to an exchanging position E. As soon as filling tube axis 14 is not parallel with brake axis 22 anymore, filling tube sensor 74 will generate the signal "0", because filling tube adapter 18 to be sensed by filling tube sensor 74 is pivoted away from interchanging position I. In an alternative embodiment, filling tube sensor 74 is configured to sense the position of filling tube 12. In that alternative case, filling tube sensor 74 would generate the signal "0" as soon as filling tube axis 14 is not parallel with brake axis 22 anymore, thereby telling control device 44 that no filling tube 12 is mounted correctly to mounting unit 30.

Referring to FIGS. 7 and 8, casing brake unit 20 is in interchanging position I and filling tube is in exchanging position E. In exchanging position E, filling tube 12 can be removed from mounting unit 30 by being moved along filling tube axis 14 without getting in conflict with brake body 24 of casing brake unit 20. Moreover, in this state, brake body 24 can be removed from brake frame 25.

Description of Sensor and Drive Assisted Mounting Process

At first a filling tube 12 is inserted into mounting unit 30. FIGS. 7 and 8 illustrate the condition when filling tube 12 is already inserted. In this working position, all sensors generate the signal "0".

In a following step, the operator has to pivot filling tube 12 around pivot axis 35a towards casing brake unit 20 until filling tube axis 14 and brake axis 22 are parallel. In other words, until filling tube 12 is in interchanging position I, wherein casing brake unit 20 is still locked in interchanging position I. This state is shown in FIGS. 6 and 7. At this point, filling tube sensor 74 will detect filling tube connector 18 or, alternatively, filling tube 12 and generate signal "1". Upon receiving signal "1" from filling tube sensor 74, control device 44 has the information that filling tube connector 18 reached interchanging position I and/or that filling tube 12 is mounted to filling assembly 10 correctly, depending on whether filling tube sensor 74 is configured for detecting the position of filling tube connector 18 or filling tube 12. Subsequently, control device 44 initiates crabbing means engaging with filling tube holder 18 and moveable part 34, thus preventing a relative pivoting action of filling tube holder 18 and moveable part 34. Furthermore, control device 44 initiates drive device 40 moving brake body 24 along brake axis 22 from releasing position R to braking position B, thereby disengaging locking means 50 by moving first tapered part 52 out of second tapered part 54. When brake body 24 reached braking position B, holder sensor 70 and casing brake sensor will generate signal "1".

When locking means 50 is disengaged as shown in FIGS. 3 and 4, casing brake unit 20 is moveable together with filling tube 12 by the operator around pivot axis 35a towards clipping machine from interchanging position I, as shown in FIGS. 3 and 4, to production position P, as shown in FIGS. 1 and 2. As soon as casing brake unit 20 and filling tube 12 leave interchanging position I, holder sensor 70 and casing brake sensor 72 start generating signal "0". When the production position P is reached, the replacement-process of filling tube 12 is completed and filling assembly 10 is ready for production.

In an alternative, not shown, automated embodiment, drive device 40 can be configured for actuating the pivoting action of casing brake unit 20 between production position P and interchanging position I. Thereby, the movement of brake body 24 between braking position B and releasing position R can be synchronized with the pivoting action of casing brake unit 20 e.g. by a cam-drive. Thus, the replacement process of filling tube 12 and/or brake body 24 can be further eased for the operator.

It is within the scope of the invention that one or more of the aforementioned steps may be automated, especially the pivoting actions of filling tube 12 and casing brake unit 20 around pivot axis 35a. Furthermore, it is within the scope the invention that position changes of brake body 24 relative to filling tube 12 and position changes of casing brake unit 20 relatively to the clipping machine are preferably subsequent, but may also be executed simultaneously, as long as no technical conflict is generated. Such technical conflict could e.g. occur when the production position P is reached before the braking position B, the releasing position R is reached before the interchanging position I. Therefore, at least the control device 44 is configured to avoid such technical conflicts.

REFERENCE LIST 10 filling assembly
12 filling tube
14 filling tube axis
16 filling tube outlet
18 filling tube connector
19 fixation nut
20 casing brake unit
22 brake axis
24 brake body
26 brake holder
26a adapter device
26b holder plate
26c holder rod
27 screw
28 brake holder guide
28a guide plate
28b guide tube
30 mounting unit
32 bearing device
34 moveable part
35 hinge
35a pivot axis
36 stationary part
37 calotte-shaped adapter
38 holding section
39a first mounting plate
39b second mounting plate
40 drive device 42a drive cylinder
42b drive rod
44 control device
50 locking means
52 first tapered part
54 second tapered part
60 stopper means
62 stopper surface
70 holder sensor
72 casing brake sensor
74 filling tube sensor
B braking position
BT bracket
E exchanging position
FD feeding direction
I interchanging position
P production position
R releasing position

The invention claimed is:

1. A filling assembly for being mounted to a clipping machine for producing sausage-shaped products, like sausages, the filling assembly comprising:
a filling tube with a filling tube axis for filling paste-like, granular and/or liquid material, in a filling process, in a feeding direction into a tubular or bag-shaped packaging casing, wherein the packaging casing to be filled is arrangeable onto the filling tube and/or to encase the filling tube;
a casing brake unit with a brake axis and a brake body for being detachably arranged on the filling tube in a braking position for providing a controlled resistance to the packaging casing against uncontrolled sliding-off the filling tube during the filling process, wherein the brake body is relatively fixable to the filling tube in the braking position and wherein the brake axis is coaxial with the filling tube axis when the brake body is arranged on the filling tube at least in the braking position; and
a mounting unit for mounting the filling tube and the casing brake unit to the clipping machine;
wherein the mounting unit comprises a bearing device for allowing a relative movement of the filling tube and the casing brake unit to the clipping machine, when the mounting unit is mounted with the filling tube and the casing brake unit to the clipping machine, wherein the relative movement is between operating positions which include at least a production position and an interchanging position, wherein, in the production position of the filling tube and the casing brake unit, the brake body is in braking position and the filling tube is arranged at the clipping machine for the filling process of the packaging casing, wherein, in at least one operating position of the filling tube and the casing brake unit, the brake body is movable along the filling tube axis to a releasing position, wherein, in the interchanging position of the filling tube and the casing brake unit, the brake body can obtain the releasing position and wherein, in the releasing position, the brake body is arranged off the filling tube.

2. The filling assembly according to claim 1,
wherein the bearing device comprises a hinge for allowing the casing brake unit being pivotally arranged at the clipping machine at least between the production position and the interchanging position, and a calotte-shaped adapter for allowing the filling tube being pivotally arranged at the clipping machine at least between the production position, the interchanging position and an exchanging position.

3. The filling assembly according to claim 1,
wherein the mutual movement of the brake body and the filling tube is actuated by a drive device.

4. The filling assembly according to claim 3, wherein a control device is provided for actuating the drive device depending on positions detected by at least one sensor respectively.

5. The filling assembly according to claim 3,
wherein a mounting assembly is provided for mounting the filling assembly to a bracket of the clipping machine.

6. The filling assembly according to claim 1, wherein the casing brake unit and the filling tube are pivotally movable relative to the clipping machine when mounted to the mounting unit.

7. The filling assembly according to claim 6,
wherein a control device is provided for actuating the drive device depending on positions detected by at least one sensor respectively.

8. The filling assembly according to claim 1, wherein the casing brake unit comprises a brake holder unit having a brake holder and a brake holder guide, wherein the brake body is arranged at the brake holder and the brake holder guide is arranged at a moveable part of the mounting unit that is relatively moveable to the clipping machine, wherein, between the interchanging position and the production position of the casing brake unit and the filling tube, brake holder is at least moveable relative to the brake holder guide in a direction parallel to the brake axis between the braking position and the releasing position.

9. The filling assembly according to claim 8,
wherein locking means are provided for holding the casing brake unit in the interchanging position.

10. The filling assembly according to claim 9,
wherein the locking means are configured for being engaged when the brake body is in the releasing position and the interchanging position and for being disengaged when the brake body is in the braking position and/or the production position.

11. The filling assembly according to claim 9,
wherein the locking means comprise a first tapered part located at the brake holder and a corresponding second tapered part located at a holding section of the mounting unit that is fixedly attachable to the clipping machine, wherein the locking means is engaged when the first tapered part is engaged with the second tapered part, and wherein the locking means is disengaged when the first tapered part is disengaged from the second tapered part.

12. The filling assembly according to claim 8, wherein the brake holder comprises an adapter device, wherein the adapter device is configured to adjust the length of the brake holder to fit the casing brake unit to the length of a respective filling tube.

13. The filling assembly according to claim 8, wherein a stopper means is arranged at the brake holder, wherein the stopper means is configured to engage with a corresponding stopper surface of the clipping machine when the brake body is in the braking position and the casing brake unit is in the production position, thus avoiding the brake body from being moved along the filling tube axis.

14. The filling assembly according to claim 8, wherein a holder sensor and a casing brake sensor are provided for detecting at least one position of the brake holder relative to the brake holder guide and for detecting at least one position of the casing brake unit relative to the clipping machine.

15. The filling assembly according to claim 14,
wherein a filling tube sensor is provided for detecting at least one position of the filling tube relative to the clipping machine.

16. The filling assembly according to claim 14,
wherein a mounting assembly is provided for mounting the filling assembly to a bracket of the clipping machine.

17. The filling assembly according to claim 14,
wherein a control device is provided for actuating the drive device depending on positions detected by at least one sensor respectively.

18. The filling assembly according to claim 8, wherein a filling tube sensor is provided for detecting at least one position of the filling tube relative to the clipping machine.

19. The filling assembly according to claim 18,
wherein a mounting assembly is provided for mounting the filling assembly to a bracket of the clipping machine.

20. The filling assembly according to claim 18,
wherein a control device is provided for actuating the drive device depending on positions detected by at least one sensor respectively.

21. The filling assembly according to claim 1, wherein a mounting assembly is provided for mounting the filling assembly to a bracket of the clipping machine.

22. A clipping machine for filling and closing tubular or bag-shaped packaging casing comprising,
characterized by a filling assembly according to claim 1.

23. The clipping machine of claim 22,
wherein the casing brake unit comprises a brake holder unit having a brake holder and a brake holder guide, wherein the brake body is arranged at the brake holder and the brake holder guide is arranged at a moveable part of the mounting unit that is relatively moveable to the clipping machine, wherein, between the interchanging position and the production position of the casing brake unit and the filling tube, brake holder is at least moveable relative to the brake holder guide in a direction parallel to the brake axis between the braking position and the releasing position, and wherein a holder sensor and a casing brake sensor are provided for detecting at least one position of the brake holder relative to the brake holder guide and for detecting at least one position of the casing brake unit relative to the clipping machine.

24. The clipping machine of claim 22,
wherein the casing brake unit comprises a brake holder unit having a brake holder and a brake holder guide, wherein the brake body is arranged at the brake holder and the brake holder guide is arranged at a moveable part of the mounting unit that is relatively moveable to the clipping machine, wherein, between the interchanging position and the production position of the casing brake unit and the filling tube, brake holder is at least moveable relative to the brake holder guide in a direction parallel to the brake axis between the braking position and the releasing position, and wherein a filling tube sensor is provided for detecting at least one position of the filling tube relative to the clipping machine.

25. The clipping machine of claim 22,
wherein the mutual movement of the brake body and the filling tube is actuated by a drive device, and wherein a control device is provided for actuating the drive device depending on positions detected by at least one sensor respectively.

* * * * *